Patented Jan. 14, 1941

2,228,374

UNITED STATES PATENT OFFICE 2,228,374

AZO DYESTUFFS

Richard Stüsser, Cologne, and Erich Fischer and Walter Gmelin, Bad Soden in Taunus, Germany, assignors to General Aniline & Film Corporation, a corporation of Delaware No Drawing. Application July 29, 1939, Serial No. 287,240. In Germany August 9, 1938

12 Claims. (Cl. 260—160)

The present invention relates to new azo dyestuffs which are capable of forming metal complex compounds; more particularly it relates to azo dyestuffs of the following formula:

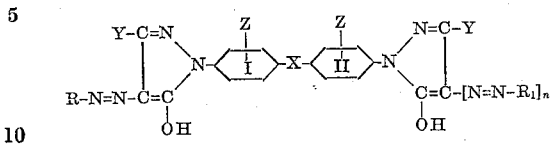

In this formula R—N=N— and $R_1$—N=N— represent radicals of aromatic diazo compounds, of which at least one bears in ortho-position to the —N=N— bridge a metal complex forming group, X stands for a bond directly linking two carbon atoms of the nuclei I and II or the bivalent bridge radical —CH=CH—, Y stands for alkyl, aryl, COOH and COO.alkyl, Z stands for hydrogen alkyl, halogen, alkoxy, COOH or $SO_3H$, and $n$ means 1 or 0.

Our new dyestuffs are obtainable by combining one or two molecular proportions of the same or different diazo compounds of aromatic amines at least one bearing a metal complex forming group in ortho-position to the amino group with pyrazolones of the following formula:

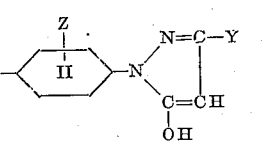

wherein X, Y and Z have the above significance.

Diazo compounds of the mentioned kind are diazo and diazo-azo compounds which bear in ortho-position to the diazo group a metal complex forming group as, for instance, OH—, —COOH, —OCH$_2$.COOH, —OCH$_2$.CH$_2$.COOH, —OCH$_3$ or —N(CH$_3$)$_2$ groups.

The new dyestuffs dye the vegetable fiber, viscose and natural silk. By aftertreatment with agents yielding metal in substance or on the fiber the dyestuffs can be converted into the metal complex compounds, whereby the fastness properties, especially the fastness to light, become improved. The dyestuffs yield in general yellow, orange, red and violet shades.

Example 1

2 molecular proportions of 2-diazo-phenoxy-acetic acid are coupled in alkaline solution with 1 molecular proportion of 1.1'-[diphenylene-(4.4')]-bis-[3-methyl-5-pyrazolone] obtained from 4.4'-dihydrazino-diphenyl and acetic acid ester. When the coupling is finished the dyestuff is salted out completely by adding some sodium chloride. A brown powder is obtained which corresponds in its free state to the following formula:

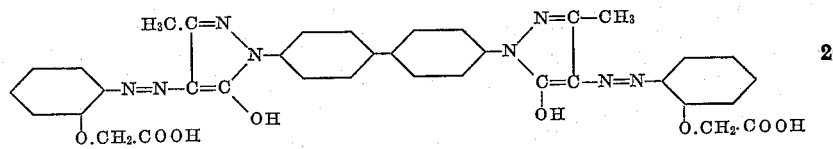

and dyes cotton, viscose and natural silk yellow shades. By aftertreatment of the dyeings with metal salts especially copper salts the dyeings become faster to light and washing. If the dicarboxylic acid of the pyrazolone (obtained by using oxalylacetic ester instead of acetoacetic ester) is used as coupling component a dyestuff is obtained which shows a somewhat greater solubility.

Example 2

1 molecular proportion of 2-diazo-phenoxy-acetic acid is coupled in aqueous suspension in the presence of sodium acetate with 1 molecular proportion of 1.1'-[diphenylene-(4.4')]-bis-[3-methyl-5-pyrazolone]. When the diazo compound has disappeared the mixture is rendered alkaline with sodium carbonate, some pyridine and 1 molecular proportion of 1-diazo-2-hydroxynaphthalene-4-sulfonic acid are added. Thereupon the solution is rendered alkaline with sodium hydroxide, stirred until the diazo compound has disappeared. The dyestuff formed is salted out, filtered off, redissolved and dried. It is a dark powder which corresponds in its free state to the following formula:

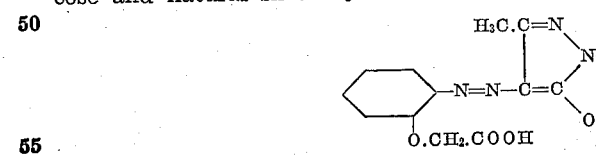

and dyes cotton yellow brown shades. By an aftertreatment with copper salts the dyeing

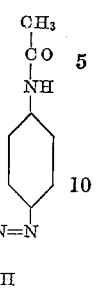

which corresponds in its free state to the following formula:

changes to red-orange-brown and becomes faster to light.

*Example 3*

2 molecular proportions of 1-diazo-2-hydroxy-naphthalene-4-sulfonic acid are coupled in sodium hydroxide alkaline solution with 1 molecular proportion of 1,1'-[diphenylene-(4,4')]-bis-[3-methyl-5-pyrazolone]. The isolated and dried dyestuff is a dark powder which corresponds in its free state to the following formula:

and dyes cotton redbrown shades, which, when aftertreated with copper salts, change to bluish-red.

*Example 4*

2 molecular porportions of 1-diazo-6-nitro-2-hydroxy-naphthalene-4-sulfonic acid are coupled in sodium hydroxyide alkaline solution with 1 molecular proportion of 1,1'-[diphenylene-(4,4')]-bis-[3-methyl-5-pyrazolone]. The isolated dyestuff is a dark powder which corresponds in its free state to the following formula:

and dyes cotton redbrown shades. When aftertreated with copper salts red shades are obtained.

*Example 5*

2 molecular proportions of 1-diazo-4-acetaminobenzene are coupled in acetic solution with 2 molecular proportions of 1-amino-6-sulfo-2-naphthoxyacetic acid. The aminoazo dyestuff is filtered off, diazotized in the usual manner and coupled with 1 molecular proportion of 1,1'-[3,3'-dimethyl-diphenylene-(4,4')]-bis-[3-methyl-5-pyrazolone] in alkaline solution in the presence of pyridine. The dyestuff is filtered off, redissolved and dried. It is a dark powder and dyes cotton wine-red shades which, when aftertreated with copper salts, change to violet.

A dyestuff of very similar properties is obtained when the di-pyrazolone obtained from 4,4'-diamino-3,3'-dichlorodiphenyl is used. By using the di-pyrazolone obtained from 4,4'-diamino-diphenyl-3,3'-dicarboxylic acid a more soluble dyestuff is obtained. If a dyestuff is formed with the di-pyrazolone obtained from 4,4'-diamino-3,3'-dimethoxydiphenyl it is also very similar in its properties to the above dyestuff but yields somewhat more reddish shades.

*Example 6*

2 molecular proportions of 1-diazobenzene-2-carboxylic acid are coupled in a solution, alkaline with sodium carbonate, with 1 molecular proportion of 4,4'-bis-[5-oxo-3-methyl-$\Delta^2$-pyrazolinyl-(1)]-stilbene-2,2'-disulfonic acid, obtained from 4,4'-dihydrazino-stilbene-2,2'-disulfonic acid and acetoacetic ester. The formed dyestuff is salted out and dried; it is a brown powder which corresponds in its free state to the following formula:

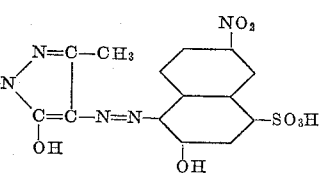

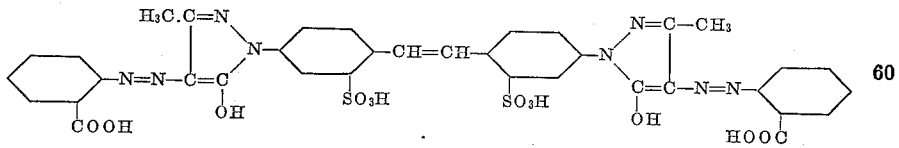

dissolves in water with yellow coloration and dyes cotton yellow shades which become faster to washing and light, when aftertreated with copper salts.

*Example 7*

2 molecular proportions of 1-diazo-2-hydroxy-3,5-dichlorobenzene are coupled in sodium hydroxide alkaline solution with 1 molecular proportion of 4,4'-bis-[5-oxo-3-methyl-$\Delta^2$-pyrazolinyl-(1)]-stilbene-2,2'-disulfonic acid. The dyestuff is salted out, filtered off and dried. It is a dark powder which corresponds in its free state to the following formula:

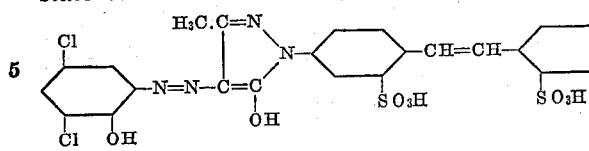

and dyes cotton yellow-brown shades which change to orange and become faster to washing and light when aftertreated with copper salts.

*Example 8*

2 molecular proportions of 1-diazo-2-hydroxy-naphthalene-4-sulfonic acid are coupled in alkaline solution with 1 molecular proportion of 4.4'-bis-[5-oxo-3-methyl-Δ²-pyrazolinyl-(1)]-stilbene-2.2'-disulfonic acid. The isolated dyestuff is a dark powder which corresponds in its free state to the following formula:

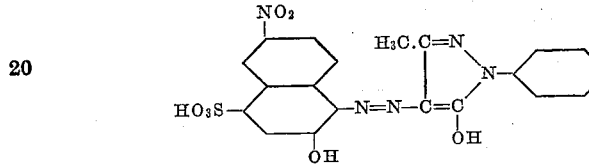

and dyes cotton brown-red shades which change to bluish-red and become faster to washing and light, when aftertreated with copper salts.

*Example 9*

2 molecular proportions of 1 diazo-6-nitro-2-hydroxy-naphthalene-4-sulfonic acid are coupled in sodium carbonate alkaline solution with 1 molecular proportion of 4.4'-bis-[5-oxo-3-phenyl-Δ²-pyrazolinyl-(1)]-stilbene-2.2'-disulfonic acid. The dyestuff is salted out, filtered off and dried. It is a dark, watersoluble powder, which corresponds to the following formula:

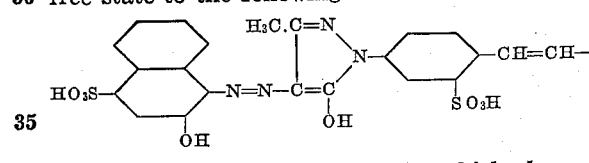

and dyes cotton Bordeaux-red shades. The dyeings, when after-treated with copper salts, change into bluish-red shades, with cobalt salts and nickel salts into yellowish-red shades and with chromium chloride into brown-red shades.

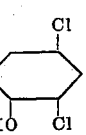

*Example 10*

2 molecular proportions of 1-diazo-6-nitro-2-hydroxy-naphthalene-4-sulfonic acid are coupled in alkaline solution with 1 molecular proportion of 4.4'-bis-[5-oxo-3-methyl-Δ²-pyrazolinyl-(1)]-stilbene. After working up in the usual way the dyestuff is obtained as a dark powder. It corresponds to the following formula:

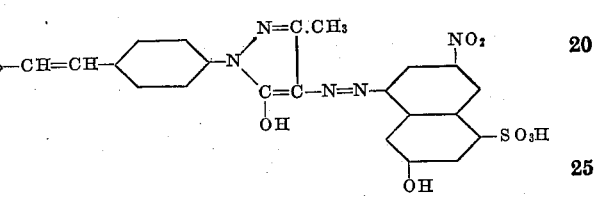

and dyes cotton red-brown shades, which change into red shades and become faster to washing and light when aftertreated with agents yielding copper.

*Example 11*

2 molecular proportions of 1 diazo-2-methoxy-benzene are coupled with 1 molecular proportion of 4.4'-bis-[5-oxo-3-methyl-Δ²-pyrazolinyl-(1)]-stilbene-2.2'-disulfonic acid. The dyestuff is salted out, filtered off and dried. It is a yellow, water-soluble powder, which corresponds to the following formula:

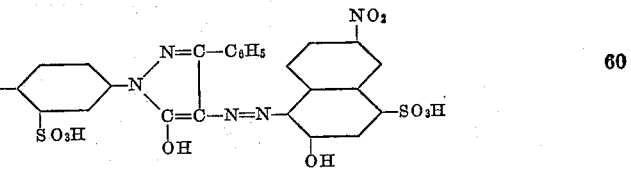

and dyes cotton yellow shades.

*Example 12*

1 molecular proportion of 1-diazo-2-hydroxy-3.4.5.6-tetrachlorobenzene are coupled with 1 molecular proportion of 4.4'-bis-[5-oxo-3-methyl-Δ²-pyrazolinyl-(1)]-stilbene-2.2'-disulfonic acid. The dyestuff is salted out, filtered off and dried. It is a dark powder, which corresponds to the following formula:

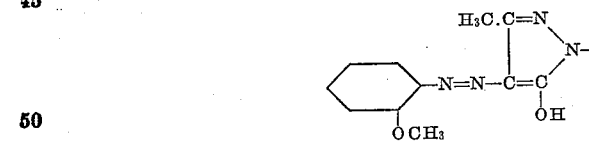

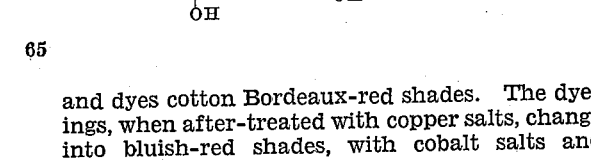

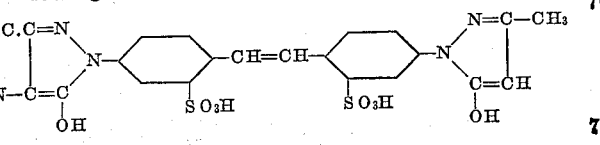

Example 13

1 molecular proportion of 1-diazo-2.5-dichlorobenzene are coupled in acetic solution with 1 molecular proportion of 4.4'-bis-[5-oxo-3-methyl-Δ²-pyrazolinyl-(1)]-stilbene-2.2'-disulfonic acid. Thereupon the reaction mixture is rendered alkaline with sodium carbonate and 1 molecular proportion of 1-diazo-2-hydroxy-3.5-dichlorobenzene is added. After stirring for some time the mixture is rendered alkaline with sodium hydroxide. When the coupling is finished the dyestuff is isolated and dried. It is a dark powder which corresponds to the following formula:

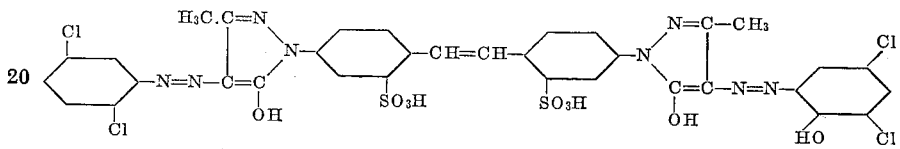

and dyes cotton yellow-brown shades, which change to red-orange shades when aftertreated with copper salts.

Example 14

2 molecular proportions of 1-diazo-3.5.6-trichloro-2-hydroxybenzene are coupled in sodium carbonate alkaline solution with 1 molecular proportion of 4.4'-bis-[5-oxo-3-carboxyethyl-Δ²-pyrazolinyl-(1)]-stilbene-2.2'-disulfonic acid. It is a dark powder, which corresponds to the following formula:

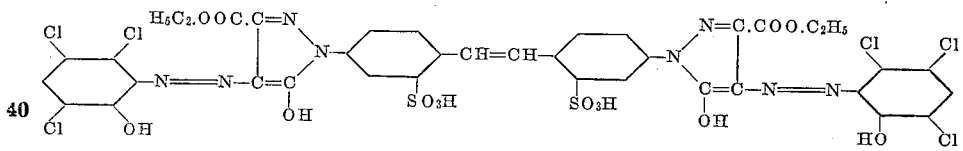

and dyes cotton, when aftertreated on the fiber with copper salts, yellow-brown shades.

Example 15

2 molecular proportions of 1-diazo-3.5.6-trichloro-2-hydroxybenzene are coupled in alkaline solution with 1 molecular proportion of 4.4'-bis-[5-oxo-3-methyl - Δ² - pyrazolinyl - (1)]-stilbene-2.2'-disulfonic acid. The dyestuff is worked up in the usual way. It is a brown powder, which corresponds to the following formula:

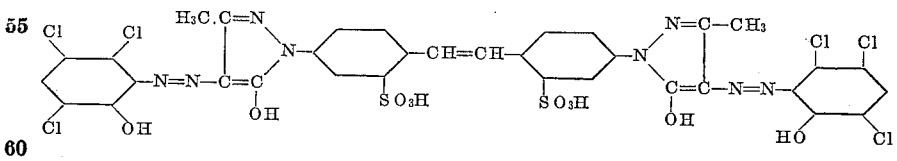

and dyes wool, cotton, viscose and silk orange-brown shades, which become faster to light and washing when aftertreated with copper salts.

We claim:

1. As new products azodyestuffs of the general formula:

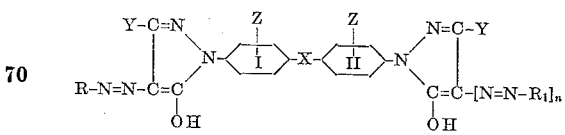

wherein R—N=N— and R₁—N=N— represent radicals of aromatic diazo compounds selected from the group consisting of the benzene and naphthalene series of which at least one bears in ortho-position to the —N=N—bridge a metal complex forming group, X stands for a member selected from the group consisting of a bond directly linking two carbon atoms of the nuclei I and II and the bivalent bridge radical

—CH=CH—

Y stands for one of the group consisting of alkyl, aryl, COOH and COO.alkyl, Z stands for one of the group consisting of hydrogen, alkyl, alkoxy, halogen, COOH and SO₃H, and $n$ means one of the numbers 1 and 0.

2. As new products azodyestuffs of the general formula:

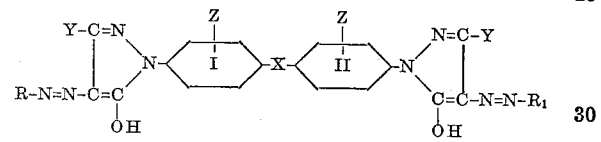

wherein R—N=N— and R₁—N=N— represent radicals of aromatic diazo compounds selected from the group consisting of the benzene and naphthalene series of which at least one bears in ortho-position to the —N=N—bridge a metal complex forming group, X stands for a member selected from the group consisting of a bond directly linking two carbon atoms of the nuclei I and II and the bivalent bridge radical

—CH=CH—

Y stands for one of the group consisting of alkyl, aryl, COOH and COO.alkyl, and Z stands for one of the group consisting of hydrogen, alkyl, alkoxy, halogen, COOH and SO₃H.

3. As new products azodyestuffs of the general formula:

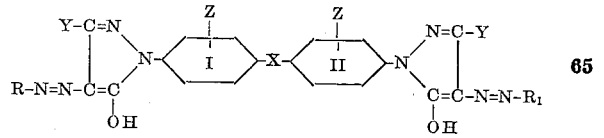

wherein R—N=N— and R₁—N=N— represent radicals of aromatic diazo compounds selected from the group consisting of the benzene and naphthalene series bearing in ortho-position to the —N=N—bridge a metal complex forming group, X stands for a member selected from the group consisting of a bond directly linking two carbon atoms of the nuclei I and II and the bivalent bridge radical —CH=CH—, Y stands for one of the group consisting of alkyl, aryl, COOH and COO.alkyl, and Z stands for one of the group consisting of hydrogen, alkyl, alkoxy, halogen, COOH and SO₃H.

4. As new products azodyestuffs of the general formula:

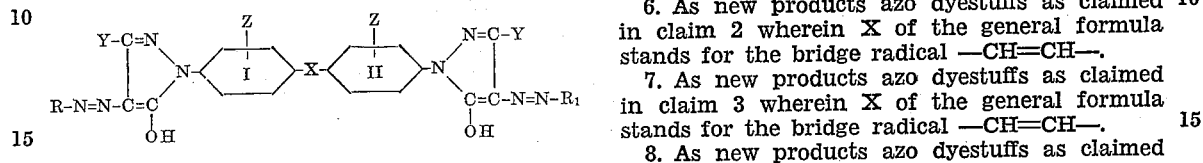

wherein R—N=N— and R₁—N=N— are identical and represent radicals of aromatic diazo compounds selected from the group consisting of the benzene and naphthalene series bearing in ortho-position to the —N=N—bridge a metal complex forming group, X stands for a member selected from the group consisting of a bond directly linking two carbon atoms of the nuclei I and II and the bivalent bridge radical

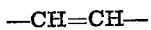

Y stands for one of the group consisting of alkyl, aryl, COOH and COO.alkyl, and Z stands for one of the group consisting of hydrogen, alkyl, alkoxy, halogen, COOH and SO₃H.

5. As new products azo dyestuffs of the general formula:

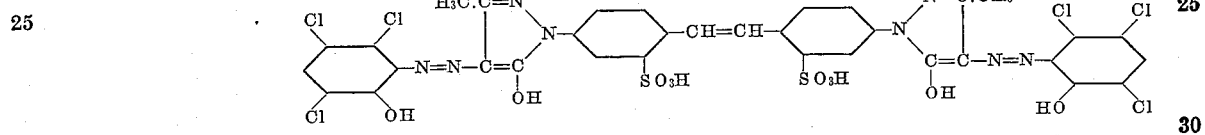

wherein R—N=N— and R₁—N=N— are identical and represent radicals of aromatic diazo compounds selected from the group consisting of the benzene and naphthalene series bearing in ortho-position to the —N=N—bridge a metal complex forming group, X stands for a member selected from the group consisting of a bond directly linking two carbon atoms of the nuclei I and II and the bivalent bridge radical —CH=CH—, Y stands for alkyl, and Z stands for one of the group consisting of hydrogen, alkyl, alkoxy, halogen, COOH and SO₃H.

6. As new products azo dyestuffs as claimed in claim 2 wherein X of the general formula stands for the bridge radical —CH=CH—.

7. As new products azo dyestuffs as claimed in claim 3 wherein X of the general formula stands for the bridge radical —CH=CH—.

8. As new products azo dyestuffs as claimed in claim 4 wherein X of the general formula stands for the bridge radical —CH=CH—.

9. As new products azo dyestuffs as claimed in claim 5 wherein X of the general formula stands for the bridge radical —CH=CH—.

10. As new product the azo dyestuff which corresponds in its free state to the formula:

and dyes wool, cotton, viscose and silk orange-brown shades becoming faster to light and washing when aftertreated with agents yielding copper.

11. As new product the azo dyestuff which corresponds in its free state to the formula:

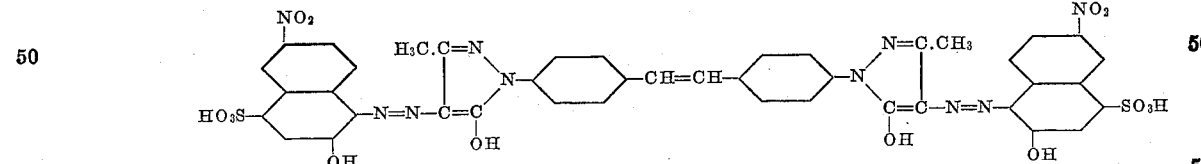

and dyes cotton yellow shades becoming faster to light and washing when aftertreated with agents yielding copper.

12. As new product the azo dyestuff which corresponds in its free state to the formula:

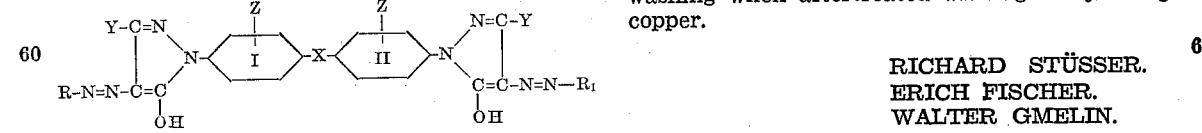

and dyes cotton red-brown shades changing to red shades and becoming faster to light and washing when aftertreated with agents yielding copper.

RICHARD STÜSSER.
ERICH FISCHER.
WALTER GMELIN.